Figure 1:
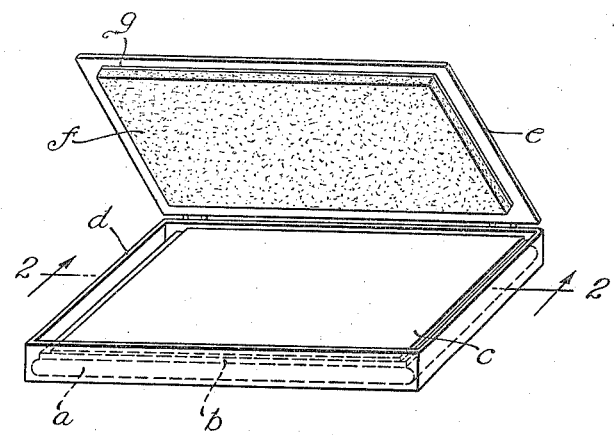

Aug. 16, 1938.  W. GOLDSCHMIDT  2,126,769
CASSETTE, PARTICULARLY FOR X-RAY EXPOSURES
Filed April 5, 1937

Inventor:
Wilhelm Goldschmidt

Patented Aug. 16, 1938

2,126,769

UNITED STATES PATENT OFFICE 2,126,769

CASSETTE, PARTICULARLY FOR X-RAY EXPOSURES

Wilhelm Goldschmidt, Erlangen, Germany, assignor to Siemens-Reiniger-Werke A. G., Berlin, Germany, a corporation of Germany Application April 5, 1937, Serial No. 135,062
In Germany August 14, 1936

3 Claims. (Cl. 250—34)

The invention relates broadly to film holders, and is specifically concerned with cassettes for X-ray exposures.

There are generally two principal ways of handling films or carriers of sensitized emulsions, and particularly X-ray films: namely, the direct exposure procedure; and the screen or double screen technique. A suitable lead-backed cardboard exposure holder is used in the first procedure, and a so-called cassette is employed in the screen technique wherein the X-ray film or its equivalent is placed in contact with or between suitable intensifying screens.

The invention is directed to improvements in connection with such cassettes without, however, being strictly limited thereto.

The intensifying screens employed in cassettes of this type may be made of a suitable fluorescent material provided on a carrier or support. This material absorbs X-rays and emits visible light. The active face of the screen is put in direct contact with the film and, when the X-ray beam passes through the area which is to be radiographed to the screen it causes the screen to fluoresce, whereby the greater part of the X-rays is absorbed and the image is formed mainly by the fluorescent light from the screen. The X-rays passing through the sensitized emulsion are thus fully utilized, shortening the exposure time, because the visible light from the screen is emitted to the sensitized surfaces of the film, intensifying the radiographic effect. The fluorescent light from the screen or screens obeys the laws of ordinary light and will not pass through opaque bodies. It follows, therefore, that there must be no dust or dirt particles between the screen and the film surfaces, because they also would absorb the fluorescent light and cause extraneous shadows on the radiograph.

It also follows as a consequence of the above noted properties and functions of the corresponding elements, that the contact between the emulsion-coated surface and the surface of such a screen must be as nearly perfect as possible, because without optical contact the fluorescent light will spread and produce blurred images.

The principal object of my invention is concerned with the provision of improvements whereby such substantially perfect contact is obtained.

This result is attained by the provision of a novel cassette for the purpose explained above, and particularly by the provision of a novel means, e. g., a resilient or flexible pad for such cassettes, made in the form of an envelope and filled with a liquid or semi-liquid substance at the proper pressure so as to provide a reliable elastic support or backing of the proper and requisite resiliency whereby an improved and invariably effective and reliable uniform contact is obtained between intensifying screens and the sensitized film.

A special object is realized by the use of a suitably shaped envelope made of an elastic material, such as rubber or the like, and filling the pad with a substance which is chemically inert or neutral to the pad material; that is, one which does not react to or with the pad material and consequently does not attack it in any way that might cause the pad to lose or to change its predetermined resiliency.

Figure 2:

One embodiment of the invention is diagrammatically illustrated in the accompanying drawing, in which Fig. 1 is a plan view of my improved cassette, while Fig. 2 is a section on the line 2—2, Fig. 1.

Reference character $d$ designates the body of a cassette having a lid $e$, to which is secured a sheet $g$ of lead or other material which is opaque to X-rays, covered by a layer of felt $f$. The new pad is indicated at $a$. It may consist of rubber or other suitable elastic material. This pad is filled with any desired and suitable liquid or jelly or gruel-like substance of a character which is chemically neutral or inert to the pad material, as noted before, so that no detrimental reaction can occur. The filling may consist, for example, of water or glycerine or of a water-glycerine mixture. Semi-liquid substances may be used for filling the pad, for example, materials having the jelly or gruel-like consistency, as already noted. It should be noted that the designation "substantially liquid" as used herein is intended to comprehend any and all types of substance used for filling the bag or pad, including substances which range in consistency from liquid to jelly and gruel-like matter.

The pad can be filled ready for use at the place of manufacture and needs no adjustments or renewal during normal use. The predetermined filling will be maintained at the originally provided pressure, because it has been found that an elastic substance, such as rubber, is substantially leak-proof when filled with liquid or semi-liquid chemically non-reactive matter. Reference character $b$ represents the intensifying screen placed adjacent the pad and held thereby in perfect contact with the surface of the member $c$ which represents the carrier of the sensitized emulsion.

It is understood, of course, that other parts of the cassette may be constructed so as to conform to the requirements of its intended use or to common practice. Accordingly, the lid may be made of suitable metal or alloy with a sheet lead lining to prevent film fog. It may also be provided with an additional resilient covering, for example, felt or the like, for the support of the corresponding intensifying screen. This provision is noted merely as an example of the structural details of one embodiment of the cassette cover. If desired, the cover may be fitted with a pad or may close against a pad such as disclosed herein. The cassette may also be provided with suitable closing and locking means including, if desired, compression springs or the like. The frame or foundation of the cassette may also be made in any desired and approved manner so as to furnish the required flat surface as a basis for the cassette construction.

Assuming that screens and film are properly placed in a cassette constructed in accordance with my invention and the lid is closed and clamped down, it will be apparent that both the screens and the film will be held between two resilient surfaces, at least one of which (a) is made of an elastic pad containing a liquid or semi-liquid substance, as previously defined. A substantially perfect contact is thus reliably obtained with certainty, without the need of any extraneous packing or time-consuming and uncertain adjusting operations. Inasmuch as the liquid pressure within the pad is correctly predetermined substantially for the life thereof, a deformation of the cassette, and especially of the lid, is practically excluded in normal use.

It will be apparent that filling substances which are known to be adapted by their composition and normal properties to fill and seal pores which are normally present in the pad material, for example, rubber, are especially adapted for use in the novel pad. Accordingly, their use forms a feature of this invention.

It will likewise be apparent that I have described the invention in connection with cassettes for X-ray work in order to teach others how it may be used in practice. Modifications and different embodiments and uses are possible. Accordingly, I do not desire to be strictly limited to the precise form of the invention disclosed herein, except within the scope and spirit of the appended claims, wherein I have defined what is believed to be new and what is desired to have protected by United States Letters Patent.

I claim:

1. In a cassette for making Roentgen exposures with the aid of an intensifying screen, a shallow container having a bottom which is transparent to Roentgen rays, an elastic envelope filled with a fluid and removably positioned in said container against the bottom thereof, a lid or cover for said container, and a sheet of material opaque to Roentgen rays secured to the inside of said cover, and a layer of resilient material covering said sheet of opaque material and adapted to cooperate with said envelope to secure uniform surface contact between a film and intensifying screen pressed between said layer and envelope when the said lid is closed.

2. In a cassette for making Roentgen exposures with the aid of an intensifying screen, a shallow container having a bottom transparent to Roentgen rays, an elastic envelope removably positioned in said container against the bottom thereof, a filling for said envelope comprising a liquid transparent to Roentgen rays, said envelope acting as a support for an intensifying screen and film and serving to space such screen and film away from the bottom of the container, and an opaque cover for said container adapted when closed to press the said film and screen against said envelope and thereby secure uniform surface contact between said film and screen.

3. In a cassette for making Roentgen exposures with the aid of an intensifying screen, the combination with a shallow receptacle and cover therefor, of a sealed elastic envelope adapted to be removably inserted in said receptacle along with a screen and film in superimposed relation, and an adjusted quantity of liquid filling said envelope and serving to expand the same sufficiently so that when the container cover is closed said screen and film will be pressed together, said liquid being incapable of penetrating said envelope or of reacting with it chemically, whereby the said sealed envelope retains its volume indefinitely.

WILHELM GOLDSCHMIDT.